United States Patent
Shih (10) Patent No.: US 12,026,041 B2
(45) Date of Patent: Jul. 2, 2024

(54) INTERFACE CIRCUIT, MEMORY CONTROLLER AND METHOD FOR CALIBRATING SIGNAL PROCESSING DEVICES IN AN INTERFACE CIRCUIT

(71) Applicant: Silicon Motion, Inc., Hsinchu County (TW)

(72) Inventor: Fu-Jen Shih, New Taipei (TW)

(73) Assignee: Silicon Motion, Inc., Hsinchu County (TW)

(*) Notice: Subject to any disclaimer, the term of this patent is extended or adjusted under 35 U.S.C. 154(b) by 16 days.

(21) Appl. No.: 17/948,254

(22) Filed: Sep. 20, 2022

(65) Prior Publication Data

US 2023/0168958 A1 Jun. 1, 2023

(30) Foreign Application Priority Data

Nov. 30, 2021 (TW) ................................ 110144629

(51) Int. Cl.
*G06F 11/00* (2006.01)
*G06F 11/07* (2006.01)
*H04L 1/00* (2006.01)

(52) U.S. Cl.
CPC ...... *G06F 11/0751* (2013.01); *G06F 11/0745* (2013.01); *H04L 1/0016* (2013.01)

(58) Field of Classification Search
CPC ................. G06F 11/0745; G06F 11/1044
See application file for complete search history.

(56) References Cited

U.S. PATENT DOCUMENTS

| 10,467,177 | B2 | 11/2019 | Shokrollahi |
| 10,552,253 | B2 | 2/2020 | Iyer |
| 2011/0179315 | A1* | 7/2011 | Yang ............... H04L 1/203 714/48 |
| 2019/0028236 | A1* | 1/2019 | Tonietto ........... H04L 1/0009 |
| 2019/0114280 | A1* | 4/2019 | Li .................. G06F 13/1605 |

FOREIGN PATENT DOCUMENTS

| CN | 112997158 A | 6/2021 |
| CN | 112313881 B | 11/2021 |
| TW | I563516 B | 12/2016 |

* cited by examiner

*Primary Examiner* — Amine Riad
(74) *Attorney, Agent, or Firm* — Winston Hsu (57) ABSTRACT

An interface circuit includes a signal processing circuit configured to process a reception signal received from a host device and a transmission signal to be transmitted to the host device. The signal processing circuit includes multiple signal processing devices and a calibration device. The calibration device is coupled to the signal processing devices and configured to sequentially calibrate a characteristic value of each signal processing device in a calibration procedure.

10 Claims, 6 Drawing Sheets

INTERFACE CIRCUIT, MEMORY CONTROLLER AND METHOD FOR CALIBRATING SIGNAL PROCESSING DEVICES IN AN INTERFACE CIRCUIT

BACKGROUND OF THE INVENTION

1. Field of the Invention

The invention relates to a method for calibrating signal processing devices in an interface circuit, more particularly to a method for calibrating signal processing devices in an interface circuit configured to provide high speed data transmission.

2. Description of the Prior Art

Serializer-Deserializer (SerDes) is a pair of function blocks commonly used in high-speed communication to compensate for limited input/output. SerDes is configured to convert data between serial data and parallel interfaces in either direction. The primary purpose of a SerDes is to provide data transfer over a single line or a differential pair to minimize the number of input/output pins and interconnects.

SerDes operates at high frequency. However, high frequency signal transmission has low tolerance to frequency or voltage jitter. Therefore, if the characteristic values of the signal processing devices in the SerDes drift, the frequency or voltage jitter caused by the drift may cause fatal errors to the signal processing in SerDes. Once a fatal error occurs, the system must be powered off or reset, causing a lot of inconvenience.

To avoid fatal errors to occur in high-speed communication systems, a method for calibrating signal processing devices inside the SerDes is required to efficiently calibrate the characteristic values of the internal signal processing devices.

SUMMARY OF THE INVENTION

It is an objective of the invention to efficiently calibrate the signal processing devices inside the SerDes, so as to avoid fatal errors to occur in the high-speed communication system due to the deviation or drift of the corresponding characteristic value of the signal processing devices.

According to an embodiment of the invention, an interface circuit comprises a signal processing circuit. The signal processing circuit is configured to process a reception signal received from a host device and a transmission signal to be transmitted to the host device. The signal processing circuit comprises a plurality of signal processing device and a calibration device. The calibration device is coupled to the signal processing devices and configured to sequentially calibrate a characteristic value of each signal processing device in a calibration procedure.

According to another embodiment of the invention, a memory controller coupled to a memory device and configured to control access operation of the memory device comprises a host interface, configured to communicate with a host device and comprising a signal processing circuit configured to process a reception signal received from the host device and a transmission signal to be transmitted to the host device. The signal processing circuit comprises a plurality of signal processing device and a calibration device. The calibration device is coupled to the signal processing devices and configured to sequentially calibrate a characteristic value of each signal processing device in a calibration procedure. In response to a trigger signal, the calibration device is configured to obtain a probe result of each signal processing device and calibrate the characteristic value of each signal processing device according to the corresponding probe result.

According to yet another embodiment of the invention, a method for calibrating a plurality of signal processing devices in an interface circuit comprises: detecting whether at least one of a plurality of predetermined error events has occurred and generating a trigger signal when detecting that at least one of the plurality of predetermined error events has occurred; probing each signal processing device in response to the trigger signal to generate a corresponding probe result; and sequentially calibrating a characteristic value of each signal processing device according to the corresponding probe result in response to the trigger signal in a calibration procedure.

These and other objectives of the present invention will no doubt become obvious to those of ordinary skill in the art after reading the following detailed description of the preferred embodiment that is illustrated in the various figures and drawings.

DETAILED DESCRIPTION

In the following, numerous specific details are described to provide a thorough understanding of embodiments of the invention. However, one of skilled in the art will understand how to implement the invention in the absence of one or more specific details, or relying on other methods, elements or materials. In other instances, well-known structures, materials or operations are not shown or described in detail in order to avoid obscuring the main concepts of the invention.

Reference throughout this specification to "one embodiment", "an embodiment", "one example" or "an example" means that a particular feature, structure or characteristic described in connection with the embodiment or example is included in at least one embodiment of a plurality of embodiments. Thus, appearances of the phrases "in one embodiment", "in an embodiment", "one example" or "an example" in various places throughout this specification are not necessarily all referring to the same embodiment or example. Furthermore, the particular features, structures or characteristics may be combined in any suitable combinations and/or sub-combinations in one or more embodiments or examples.

In addition, in order to make the objects, features and advantages of the invention more comprehensible, specific embodiments of the invention are set forth in the accompanying drawings. This description is made for the purpose of illustrating the general principles of the invention and should not be taken in a limiting sense. It should be understood that the following embodiments can be implemented by software, hardware, firmware, or any combination thereof.

Figure 1:
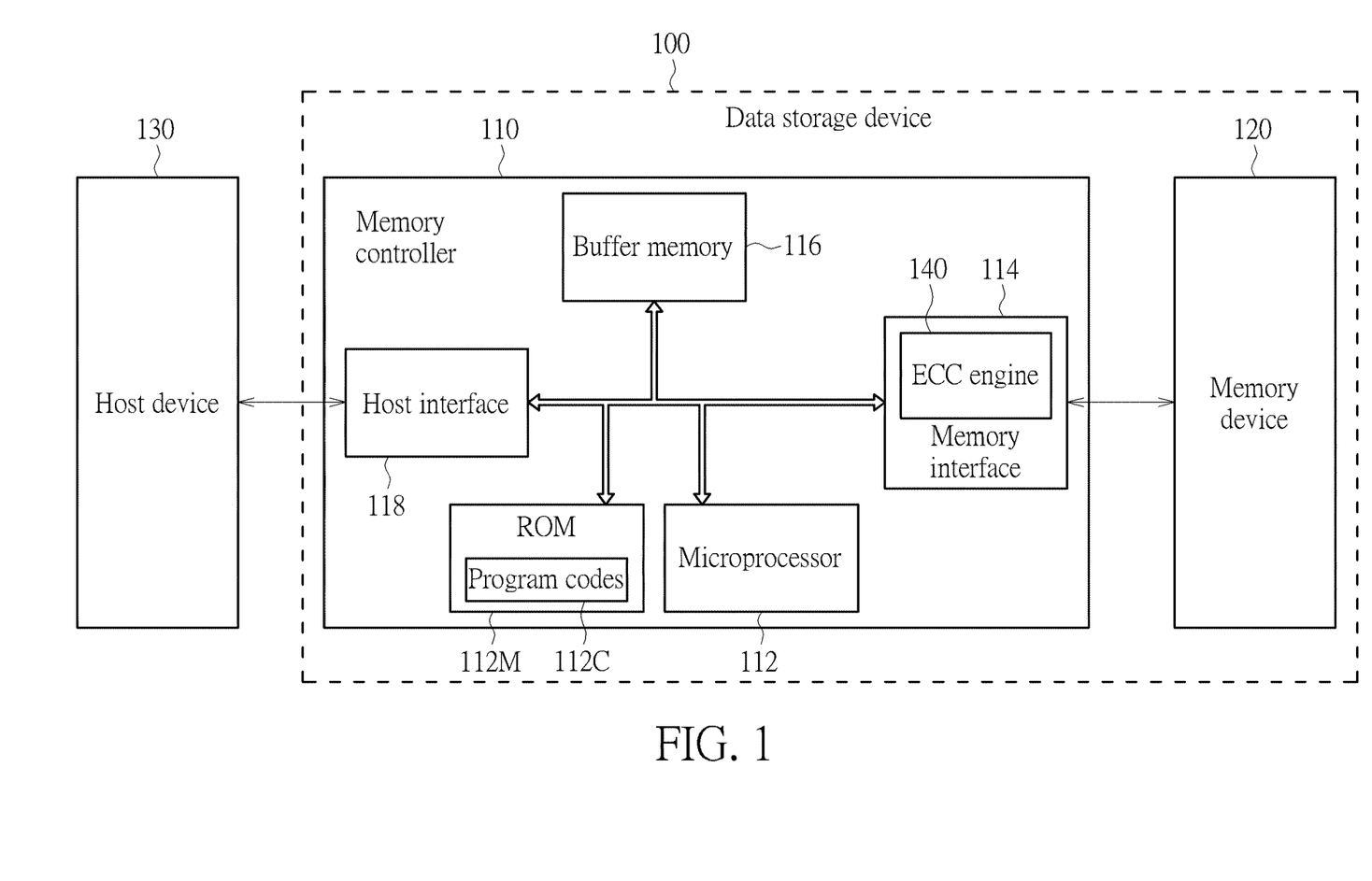
FIG. 1 is an exemplary block diagram of a data storage device according to an embodiment of the invention.

FIG. 1 is an exemplary block diagram of a data storage device according to an embodiment of the invention. The data storage device 100 may comprise a memory device 120 and a memory controller 110. The memory controller 110 is configured to access the memory device 120 and control operations of the memory device 120. The memory device 120 may be a non-volatile (NV) memory (e.g. a Flash memory) device and may comprise one or more memory elements (e.g. one or more Flash memory dies, or one or more Flash memory chip, or the likes).

The data storage device 100 may be coupled to a host device 130. The host device 130 may comprise at least one processor, a power supply circuit, and at least one random access memory (RAM), such as at least one dynamic RAM (DRAM), at least one static RAM (SRAM), . . . etc. (not shown in FIG. 1). The processor and the RAM may be coupled to each other through a bus, and may be coupled to the power supply circuit to obtain power. The processor may be arranged to control operations of the host device 130, and the power supply circuit may be arranged to provide the processor, the RAM, and the data storage device 100 with power. For example, the power supply circuit may output one or more driving voltages to the data storage device 100. The data storage device 100 may obtain the one or more driving voltages from the host device 130 as the power of the data storage device 100 and provide the host device 130 with storage space.

According to an embodiment of the invention, the host device 130 may issue commands, such as the read command or the write command, to the data storage device 100, so as to access the data stored in the memory device 120, or the host device 130 may issue commands to further control or manage the data storage device 100.

According to an embodiment of the invention, the memory controller 110 may comprise a microprocessor 112, a Read Only Memory (ROM) 112M, a memory interface 114, a buffer memory 116 and a host interface 118. The ROM 112M is configured to store program codes 112C. The microprocessor 112 is configured to execute the program codes 112C, thereby controlling access to the memory device 120. The program codes 112C may comprise one or more program modules, such as the boot loader code. When the data storage device 100 obtains power from the host device 130, the microprocessor 112 may perform an initialization procedure of the data storage device 100 by executing the program codes 112C. In the initialization procedure, the microprocessor 112 may load a group of In-System Programming (ISP) codes (not shown in FIG. 1) from the memory device 120. The microprocessor 112 may execute the group of ISP codes, so that the data storage device 100 has various functions. According to an embodiment of the invention, the group of ISP codes may comprise, but are not limited to: one or more program modules related to memory access (e.g. read, write and erase), such as a read operation module, a table lookup module, a wear leveling module, a read refresh module, a read reclaim module, a garbage collection module, a sudden power off recovery (SPOR) module and an uncorrectable error correction code (UECC) module, respectively provided for performing the operations of read, table lookup, wear leveling, read refresh, read reclaim, garbage collection, SPOR and error handling for detected UECC error.

The memory interface 114 may comprise an error correction code (ECC) engine 140. The ECC engine 140 may comprise a data buffer (not shown in FIG. 1) for buffering data to assist the ECC engine 140 in performing the encoding and decoding on the data. In the write procedure to write data into the memory device 120, the ECC engine 140 is configured to encode the data to be written into the memory device 120, such as performing the ECC encoding, so as to generate extra parity bits. In the read procedure to read data from the memory device 120, the ECC engine 140 is configured to decode the data read from the memory device 120 to detect the error bit(s) in the data and correct the value(s) of the error bit(s) when the error is correctable (e.g., the number of error bits does not exceed the maximum number of error bits that can be corrected by the ECC engine 140).

Typically, the memory device 120 may comprise a plurality of memory elements, such as a plurality of Flash memory dies or Flash memory chips, and each memory element may comprise a plurality of memory blocks. The access unit of an erase operation performed by the memory controller 110 on the memory device 120 may be one memory block. In addition, a memory block may record (comprise) a predetermined number of pages, for example, the physical pages, and the access unit of a write operation performed by the memory controller 110 on the memory device 120 may be one page.

In practice, the memory controller 110 may perform various control operations by using its own internal components. For example, the memory controller 110 may use the memory interface 114 to control the access operations (especially the access operation for at least a memory block or at least a page) of the memory device 120, use the buffer memory 116 to perform necessary data buffer operations, and use the host interface 118 to communicate with the host device 130.

In an embodiment of the invention, the memory controller 110 may use the host interface 118 to communicate with the host device 130 in compliance with a standard communication protocol. For example, the standard communication protocol may comprise (but is not limited to) the Universal Serial Bus (USB) standard, the SD interface standard, the Ultra High Speed-I (UHS-I) interface standard, the Ultra High Speed-II (UHS-II) interface standard, the CF interface standard, the Multi Media Card (MMC) interface standard, the eMMC interface standard, the UFS interface standard, the Advanced Technology Attachment (ATA) standard, the Serial ATA (SATA) standard, the Peripheral Component Interconnect Express (PCI-E) standard, the Parallel Advanced Technology Attachment (PATA) standard, etc.

In an embodiment, the buffer memory 116 for buffering data may be implemented by a RAM. For example, the buffer memory 116 may be an SRAM, but the invention should not be limited thereto. In other embodiments, the buffer memory 116 may be a DRAM.

In an embodiment of the invention, the data storage device 100 may be a portable storage device (for example, the memory card in compliance with the SD/MMC, CF, MS and/or XD standard, the USB flash drive, or the likes), and the host device 130 may be an electronic device, such as a mobile phone, a notebook computer, a desktop computer . . . etc., capable of connecting to the data storage device. In another embodiment of the invention, the data storage device 100 may be a solid state hard disk or an embedded storage device in compliance with the UFS or the eMMC standards, and may be equipped in an electronic device such as a mobile phone, a notebook computer, or a desktop computer. In such an embodiment, the host device 130 may be a processor of the electronic device.

According to an embodiment of the invention, the host interface 118 of the memory controller 110 may comprise a Serializer-Deserializer (SerDes) configured to process a reception signal received from a host device and a transmission signal to be transmitted to the host device, so as to realize high speed data transmission between the data storage device 100 and the host device 130.

Figure 2:
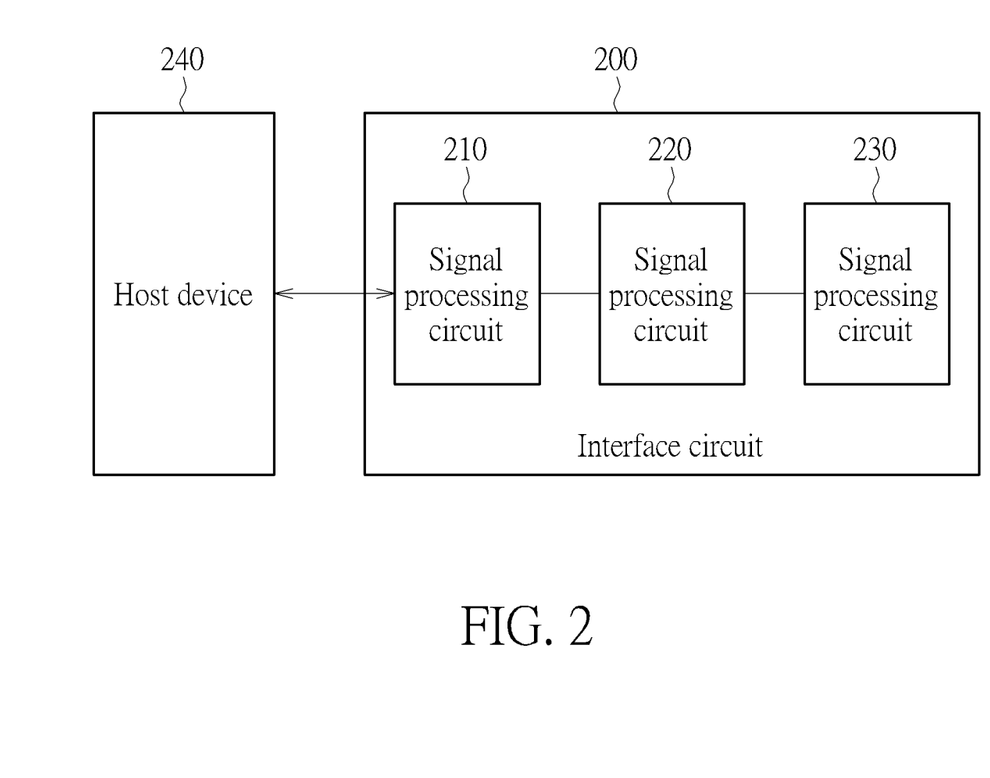
FIG. 2 is an exemplary block diagram of an interface circuit according to an embodiment of the invention.

FIG. 2 is an exemplary block diagram of an interface circuit according to an embodiment of the invention. According to an embodiment of the invention, the interface circuit 200 may be a host interface disposed between a predetermined device (as an example, a data storage device) and a host device for the host device and the predetermined device to communicate with each other through the interface circuit 200 and transmit data signal and control signal therethrough. According to an embodiment of the invention, the interface circuit 200 may be the host interface 118 configured inside the memory controller 110 as shown in FIG. 1.

The interface circuit 200 may comprise signal processing circuits 210, 220 and 230 that operate in compliance with different layer communication protocols. The signal processing circuit 210 may be the physical layer signal processing circuit to process reception signals received from the host device 240 and the transmission signals to be transmitted to the host device 240 in compliance with physical layer communication protocol. As an example, the signal processing circuit 210 may perform physical layer operations, such as amplification or attenuation, analog-to-digital or digital-to-analog conversion, frequency mixing, basic encoding or decoding, and unpacking of physical layer packet, on the reception signals and transmission signals. The signal processing circuit 220 may be the protocol layer signal processing circuit configured to perform corresponding signal processing on reception signals and the transmission signals in compliance with another layer communication protocol above the physical layer. As an example, the signal processing circuit 220 may perform signal processing on the reception signals and the transmission signals in compliance with the Unified Protocol (UniPro) developed by the Mobile Industry Processor Interface (MIPI) alliance. The signal processing circuit 220 may comprise multiple layers of signal processing circuits, for example, a physical adapter (PA) layer signal processing circuit which is coupled to the physical layer signal processing circuit, and other layers of signal processing circuits. The signal processing circuit 230 may be the application layer signal processing circuit configured to perform higher layer signal processing in compliance with the application layer protocol.

In the embodiments of the invention, the signal processing circuit 210 may be a SerDes or may be the physical layer signal processing circuit of the SerDes, to implement the high-speed data and signal transmission between the aforementioned predetermined device and host device.

Figure 3:
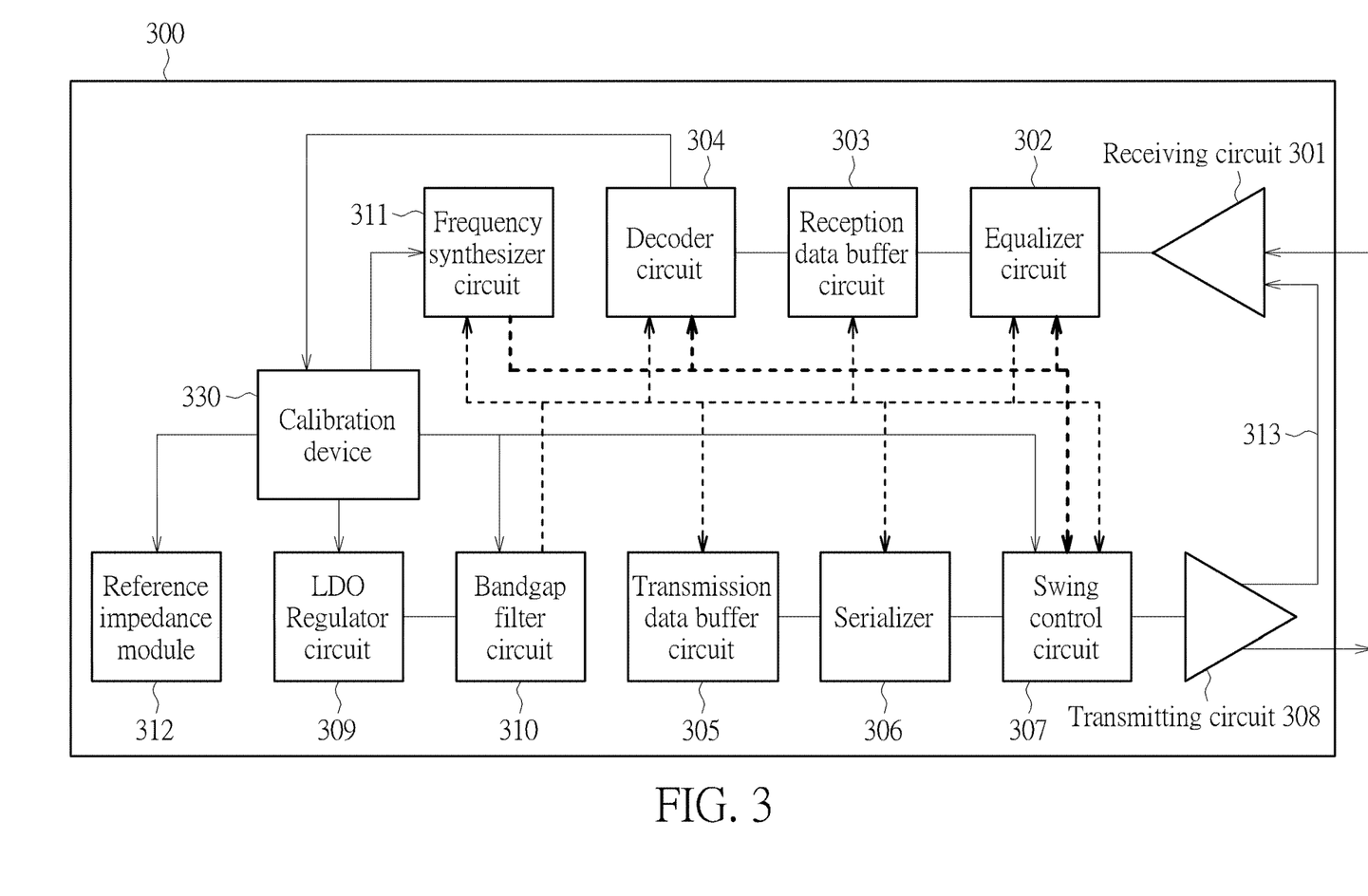
FIG. 3 is an exemplary block diagram of a signal processing circuit according to an embodiment of the invention.

FIG. 3 is an exemplary block diagram of a signal processing circuit according to an embodiment of the invention. In this embodiment, the signal processing circuit 300 may be a physical layer signal processing circuit configured inside an interface circuit, such as the physical layer signal processing circuit in the host interface of a memory controller, or the signal processing circuit 300 may be a SerDes or the physical layer signal processing circuit of the SerDes, and the signal processing circuit 300 may be configured to process the reception signals and the transmission signals.

The signal processing circuit 300 may comprise a plurality of signal processing devices and a calibration device 330. The calibration device 330 is coupled to the signal processing devices and configured to sequentially calibrate a characteristic value of each signal processing device in a calibration procedure. The signal processing devices in the signal processing circuit 300 may comprise a receiving circuit 301, an equalizer circuit 302, a reception data buffer circuit 303, a decoder circuit 304, a transmission data buffer circuit 305, a serializer 306, a swing control circuit 307, a transmitting circuit 308, a Low DropOut (LDO) Regulator circuit 309, a bandgap filter circuit 310, a frequency synthesizer circuit 311 and a reference impedance module 312.

It is to be noted that FIG. 3 is a simplified schematic diagram of a signal processing circuit, in which only the components related to the invention are shown. Those skilled in the art will be readily appreciated that a physical layer signal processing circuit may also comprise many components not shown in FIG. 3 to implement the corresponding physical layer signal processing functions.

On the reception signal processing path, the receiving circuit 301 is configured to receive signal from the host device. The equalizer circuit 302 is configured to perform equalization on the reception signals. The equalizer circuit 302 may comprise a Continuous Time Linear Equalizer (CTLE), a Clock Data Recovery (CDR) circuit and a Deserializer (not shown in FIG. 3). The CTLE is configured to process the reception signal which being a serial signal. The CDR circuit is configured to regenerate the clock signal which is synchronize with the one used at the transmitter side and to accurately recover the content of the data signal carried in the reception signal according to the clock signal. The Deserializer is configured to convert the serial data signal into a plurality of parallel signals transmitted through a plurality of buses and output the parallel signals. The reception data buffer circuit 303 is configured to buffer the reception data output by the equalizer circuit 302. The decoder circuit 304 is configured to decode the reception data. The decoded reception data is further provided to the upper layer signal processing circuit, such as the physical adapter (PA) layer signal processing circuit.

On the transmission signal processing path, the transmission data buffer circuit 305 is configured to buffer the transmission data, e.g., parallel data signals, from the upper layer signal processing circuit. The serializer 306 is configured to convert the parallel data signals into a serial data signal. The swing control circuit 307 is configured to control the swing of transmission signal, for example, adjust the voltage of the transmission signal to an adequate level. The transmitting circuit 308 is configured to transmit the transmission signal to the host device.

Besides the signal processing devices on the aforementioned reception signal processing path and transmission signal processing path, the signal processing circuit 300 may also comprise some common circuits configured to provide the frequency, current, voltage, power and/or information regarding reference impedance that are required by other signal processing devices. The LDO Regulator circuit 309 is configured to provide stable voltage signal, as an example, provide stable voltage signal to the bandgap filter circuit 310. The bandgap filter circuit 310 is configured to filter the noise in the voltage signal, so as to provide clean voltage signal to the other signal processing devices (such as the arrows with thin dotted line in FIG. 3). The frequency synthesizer circuit 311 is configured to generate the clock signal required in the signal processing circuit 300 and provide the clock signal to the other signal processing devices (such as the arrows with thick dotted line in FIG. 3). In an embodiment of the invention, the frequency synthesizer circuit 311 may be implemented by a Phase Locked Loop (PLL) and configured to generate an oscillating signal provided as the clock signal required in the signal processing circuit 300. The reference impedance module 312 may comprise a plurality of reference passive devices, as an example, the reference resistors, reference capacitors, the reference inductors, or the likes, that are provided as reference impedance. Since the characteristic values of the passive devices, such as the corresponding resistance, capacitance, inductance, or the likes, may drift due to the process variation, the reference impedance module 312 comprising the passive devices made by the same process may be configured inside the signal processing circuit 300 to provide information regarding the reference impedance. As an example, suppose that 10 Kohms is achieved by connecting the two reference resistive devices in the reference impedance module 312 in serial, this information may be provided as reference impedance information. When a signal processing device inside the signal processing circuit 300 requires the resistance of 10 Kohms, two resistors inside this signal processing device may be connected together in serial by controlling the internal switch circuit thereof according to the reference impedance information. When another signal processing device inside the signal processing circuit 300 requires the resistance of 20 Kohms, four resistors inside this signal processing device may be connected together in serial by controlling the internal switch circuit thereof according to the reference impedance information. By using the reference impedance information obtained in the same circuit to flexibly control the number of passive devices to be connected in parallel or serial, the problem of characteristic value drift due to process variation is effectively overcome. The application regarding the corresponding reference impedance information of other passive devices comprised in the reference impedance module 312 may be deduced by analogy.

According to an embodiment of the invention, the calibration device 330 may be configured to sequentially calibrate characteristic values of a plurality of signal processing devices in a calibration procedure. In addition, according to an embodiment of the invention, the calibration procedure is triggered in response to at least one error event. As an example, when the signal processing circuit 300 is a signal processing circuit disposed in a memory controller, the calibration procedure is triggered in response to at least one error event of the memory controller.

Figure 4:
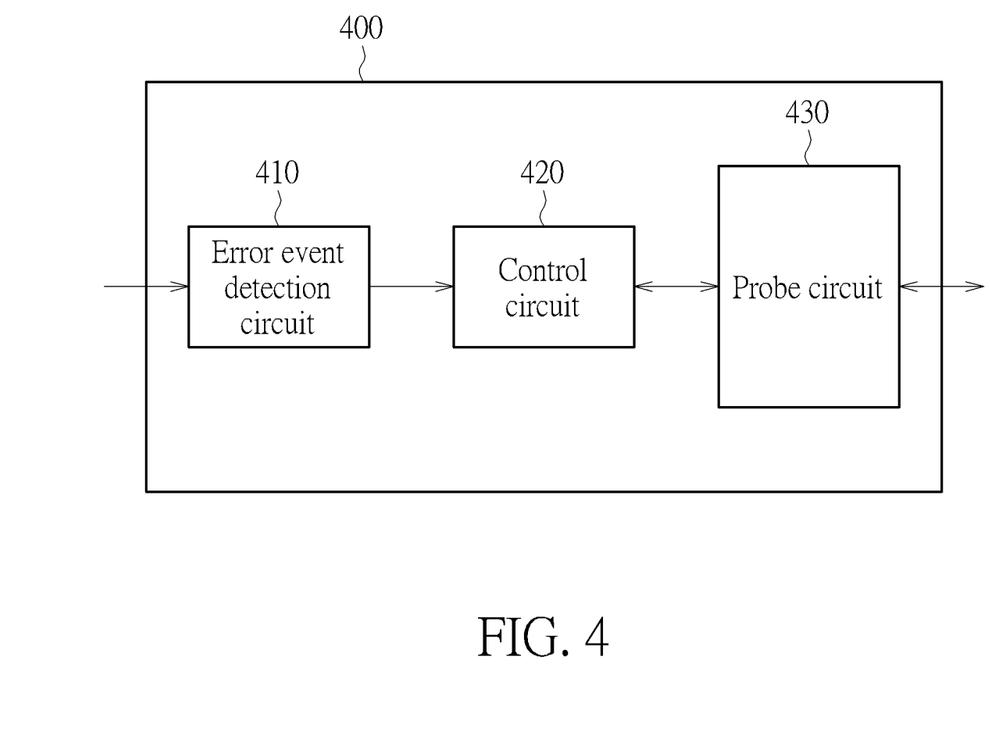
FIG. 4 is an exemplary block diagram of a calibration device according to an embodiment of the invention.

FIG. 4 is an exemplary block diagram of a calibration device according to an embodiment of the invention. The calibration device 400 may comprise an error event detection circuit 410, a control circuit 420 and a probe circuit 430. The error event detection circuit 410 is configured to detect whether at least one of a plurality of predetermined error events has occurred. When detecting that at least one of the plurality of predetermined error events has occurred, the error event detection circuit 410 may generate a trigger signal. The control circuit 420 is coupled to the error event detection circuit 410 and the probe circuit 430 and configured to perform the calibration procedure in response to the trigger signal. The probe circuit 430 is coupled to the control circuit 420 and a plurality of signal processing devices, such as the signal processing devices shown in FIG. 3. The probe circuit 430 may receive the trigger signal from the control circuit and is configured to probe each signal processing device in response to the trigger signal to generate a corresponding probe result. The control circuit 420 may receive the corresponding probe result from the probe circuit 430 and adjust a characteristic value of each signal processing device according to the corresponding probe result in the calibration procedure.

According to an embodiment of the invention, the error event detection circuit 410 may detect whether at least one of the plurality of predetermined error events has occurred by monitoring whether there is any specific request signal, indication signal or error signal is issued by the signal processing device (such as the signal processing devices 210, 220 and 230 as shown in FIG. 2 or the signal processing devices comprised in the signal processing circuit 300 as shown in FIG. 3). According to another embodiment of the invention, the signal processing devices 210, 220, 230 or the signal processing devices comprised in the signal processing circuit 300 may also transmit a notification signal to the calibration device at the same time while issuing the aforementioned specific request signal, indication signal or error signal, such that the error event detection circuit 410 may determine whether any predetermined error event has occurred in response to reception of this notification signal.

According to an embodiment of the invention, the predetermined error event may be the error event occurred in or detected inside the data storage device system or a fatal error leading to a power off or a reset of the data storage device system. In an embodiment of the invention, the predetermined error event may be an error detected by the PA layer signal processing circuit during a signal processing procedure. As an example, when the protocol layer signal processing circuit (e.g. an internal processor configured therein) detects that the content of a packet is incorrect when processing this packet, it may send an error indication signal (e.g., PA_ERROR_IND) through the PA layer signal processing circuit. In another embodiment of the invention, the predetermined error event may be the error occurred in the PA layer signal processing circuit. As an example, when an error has occurred when the decoder circuit 304 is performing decoding operations, the decoder circuit 304 may issue a symbol error signal (e.g., SYMBOL_ERROR). In another embodiment, the predetermined error event may be an event of error recovery operation performed by the interface circuit in response to a detected error, as an example, in response to a detected error, the PA layer signal processing circuit may issue a power change request signal (e.g., PACP_PWR_REQ), thereby triggering an error recovery process. When detecting that a power change request signal has been issued, the calibration device may determine that a predetermined error event has occurred.

In yet another embodiment, the predetermined error event may be an event of failure in the performance of an error recovery operation by the interface circuit in response to a detected error, that is, an event indicates that the interface circuit is unable to repair the error that has occurred by performing the error recovery operation. For example, an error signal (e.g., PA_INIT_ERROR) may be issued when the PA layer signal processing circuit is unable to repair an error that has occurred by performing an error recovery operation.

In yet another embodiment, the predetermined error event may be an event of operation mode change. For example, when the interface circuit or the memory controller comprising the interface circuit exits the Hibernate mode, some signal processing related issues may be induced since the operation of exiting the Hibernate mode may possibly cause higher frequency or voltage jitter or instability in the frequency or voltage. Therefore, when exiting the Hibernate mode, the interface circuit may issue an indication signal to notify the calibration device of the exit of the Hibernate mode (e.g., Exit_Hibernate).

In the embodiment of the invention, the error event detection circuit 410 may determine whether a predetermined error event has occurred in response to the aforementioned specific request signal, indication signal or error signal, or may determine whether a predetermined error event has occurred in response to reception of the aforementioned notification signal. When detecting that at least one predetermined error event has occurred, the error event detection circuit 410 generates a trigger signal to notify the control circuit 420 to perform the calibration procedure, and in the calibration procedure, the probe circuit 430 is configured to probe a parameter corresponding to each signal processing device to generate a corresponding probe result.

According to an embodiment of the invention, the probe circuit 430 may comprise one or more analog to digital converter (ADC) circuits configured to convert the parameter value corresponding to each signal processing device from analog to digital. In addition, the probe circuit 430 may also probe the current values of the power voltage and the ground voltage as comparison references.

In a first embodiment of the invention, the probe circuit 430 may comprise only one ADC circuit to sequentially probe the current values of the power voltage and the ground voltage and the parameter value corresponding to each signal processing device. The sequence of the probing performed by the probe circuit 430 may be designed according to the sequence in which the signal processing devices are calibrated in the calibration procedure (which will be described in the following paragraphs). Therefore, in the first embodiment of the invention, the ADC circuit in the probe circuit 430 may be shared by multiple signal processing devices.

In a second embodiment of the invention, the probe circuit 430 may comprise a plurality of ADC circuits, wherein each signal processing device to be calibrated in the calibration procedure is equipped with a dedicated ADC circuit to probe the parameter value corresponding to the signal processing device. In addition, at least one of the ADC circuits may also be configured to probe the current values of the power voltage and the ground voltage as comparison references.

In a third embodiment of the invention, the probe circuit 430 may comprise a plurality of ADC circuits, wherein each of a portion of signal processing devices to be calibrated in the calibration procedure may be equipped with a dedicated ADC circuit, while another portion of signal processing devices to be calibrated in the calibration procedure may share one ADC circuit.

Referring back to FIG. 3, the signal processing devices to be calibrated in the calibration procedure may comprise the LDO Regulator circuit 309, the bandgap filter circuit 310, the reference impedance module 312, the frequency synthesizer circuit 311, the swing control circuit 307 and the equalizer circuit 302.

For the LDO Regulator circuit 309, the probe circuit 430 may probe the input voltage at the input terminal and the output voltage at the output terminal of the LDO Regulator circuit 309 and the ADC circuit may convert the values of the probed input voltage and output voltage into digital values and provide them as the corresponding probe results to the control circuit 420.

For the bandgap filter circuit 310, the probe circuit 430 may probe the output voltage of the bandgap filter circuit 310 and the ADC circuit may convert value of the probed output voltage into a digital value and provide it as the corresponding probe result to the control circuit 420.

For the reference impedance module 312, the probe circuit 430 may probe the current value of the power voltage, the current value of the ground voltage and the value of the current generated by providing the power voltage to one or more passive devices comprised in the reference impedance module 312 and connected in serial or parallel by controlling the corresponding switch devices, and the ADC circuit may convert the values of the probed voltages and probed current into digital values and provide them as the corresponding probe results to the control circuit 420.

For the frequency synthesizer circuit 311, the probe circuit 430 may probe an input voltage of a voltage controlled oscillator (VCO) comprised in the frequency synthesizer circuit 311 and the ADC circuit may convert value of the probed input voltage into a digital value and provide it as the corresponding probe result to the control circuit 420.

For the swing control circuit 307, the probe circuit 430 may probe the voltage of the transmission signal output by the swing control circuit 307 and the ADC circuit may convert the probed voltage into a digital value and provide it as the corresponding probe result to the control circuit 420.

For the equalizer circuit 302, the probe circuit 430 may probe the voltage of the data signal output by the equalizer circuit 302 and the ADC circuit may convert value of the probed voltage into a digital value and provide it as the corresponding probe result to the control circuit 420.

Figure 5:
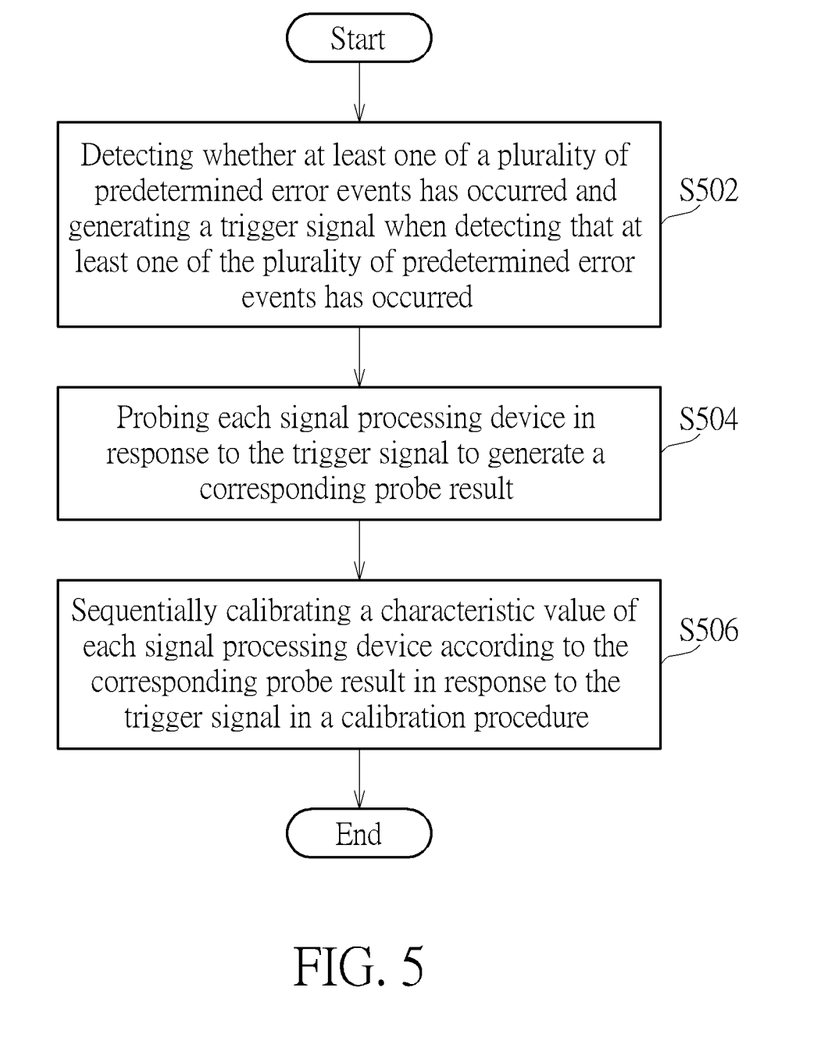
FIG. 5 is an exemplary flow chart of a method for calibrating a plurality of signal processing devices in an interface circuit according to an embodiment of the invention.

FIG. 5 is an exemplary flow chart of a method for calibrating a plurality of signal processing devices in an interface circuit according to an embodiment of the invention. The method may comprise the following steps performed by the calibration device:

Step S502: detecting whether at least one of a plurality of predetermined error events has occurred and generating a trigger signal when detecting that at least one of the plurality of predetermined error events has occurred.

Step S504: probing each signal processing device in response to the trigger signal to generate a corresponding probe result.

Step S506: sequentially calibrating a characteristic value of the signal processing devices according to the corresponding probe result of each signal processing device in response to the trigger signal in a calibration procedure.

Figure 6:
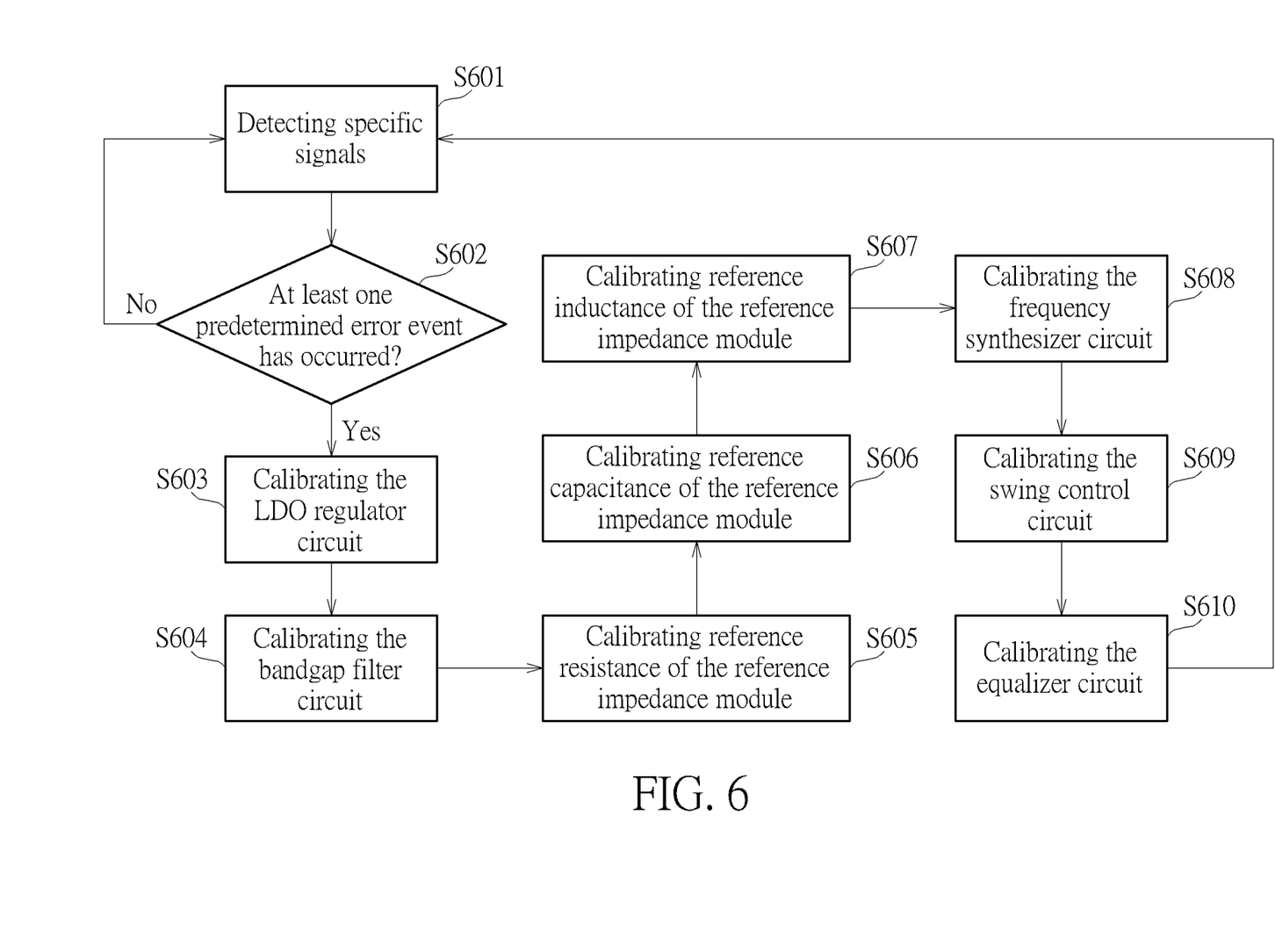
FIG. 6 is an exemplary flow chart of the calibration procedure according to an embodiment of the invention.

FIG. 6 is an exemplary flow chart of the calibration procedure according to an embodiment of the invention. The calibration procedure may comprise the following operations:

Operation S601: the error event detection circuit 410 may keep detecting specific signals or may be standby to wait for a notification signal from the signal processing circuit. The specific signals may be the aforementioned request signal, indication signal or error signal issued by the signal processing device when an error is detected, or a notification signal issued by the signal processing device to the calibration device.

Operation S602: The control circuit 420 may determine whether at least one of a plurality of predetermined error events has occurred according to the received signal. If yes, operation S603 is performed. If no, operation S601 is performed.

Operation S603: The calibration device 400 may calibrate corresponding characteristic value of the LDO regulator circuit 309. To be more specific, the probe circuit 430 may probe the input voltage at the input terminal and the output voltage at the output terminal of the LDO regulator circuit 309 and the probed input voltage and output voltage may be converted into digital values and provided to the control circuit 420. The control circuit 420 may calculate the voltage difference between the input voltage and the output voltage and compare the obtained voltage difference with a target value. When the obtained voltage difference does not reach the target value, the control circuit 420 may adjust a gain of the LDO regulator circuit 309 to make the voltage difference between the input voltage and the output voltage to satisfy the target value.

Operation S604: The calibration device 400 may calibrate corresponding characteristic value of the bandgap filter circuit 310. To be more specific, the probe circuit 430 may probe the output voltage of the bandgap filter circuit 310 and the probed output voltage may be converted into a digital value and provided to the control circuit 420. The control circuit 420 may keep receiving the probe result corresponding to the bandgap filter circuit 310, determine whether voltage jitter has occurred and calculate the amplitude of voltage jitter. When the amplitude of voltage jitter in the output voltage is greater than a threshold value, the control circuit 420 may adjust the filter bandwidth or frequency response of the bandgap filter circuit 310 to reduce the amplitude of voltage jitter in the output voltage.

Operation S605: The calibration device 400 may calibrate the reference resistance of the reference impedance module 312. To be more specific, the probe circuit 430 may probe the current values of the power voltage and the ground voltage, and after providing the power voltage to one or more resistors connected in serial or parallel, probe the value of the voltage obtained at each terminal of the resistors or the value of the current passing through each resistor, and convert the probed results into digital values and provide them to the control circuit 420. The control circuit 420 may calibrate the reference impedance information based on the obtained probed results. As an example, the control circuit 420 may calibrate the reference resistance to the currently derived impedance or the resistance of a reference resistive device, or may calibrate the reference resistance to the number of reference resistive devices that have to be connected in serial to achieve a target voltage drop.

Operation S606: The calibration device 400 may calibrate the reference capacitance of the reference impedance module 312. To be more specific, the probe circuit 430 may probe the current values of the power voltage and the ground voltage, and after providing the power voltage to one or more capacitors connected in serial or parallel, probe the value of the voltage obtained at each terminal of the capacitors or the value of the current passing through each capacitor, and convert the probed results into digital values and provide them to the control circuit 420. The control circuit 420 may calibrate the reference impedance information based on the obtained probed results. As an example, the control circuit 420 may calibrate the reference capacitance to the currently derived impedance or the capacitance of a reference capacitive device or may calibrate the reference capacitance to the number of reference capacitive devices that have to be connected in parallel to achieve a target voltage drop.

Operation S607: The calibration device 400 may calibrate the reference inductance of the reference impedance module 312. To be more specific, the probe circuit 430 may probe the current values of the power voltage and the ground voltage, and after providing the power voltage to one or more inductors connected in serial or parallel, probe the value of the voltage obtained at each terminal of the inductors or the value of the current passing through each inductor, and convert the probed results into digital values and provide to the control circuit 420. The control circuit 420 may calibrate the reference impedance information based on the obtained probed results. As an example, the control circuit 420 may calibrate the reference inductance to the currently derived impedance or the inductance of a reference inductive device or may calibrate the reference inductance to the number of reference inductive devices that have to be connected to achieve a target voltage drop.

Operation S608: The calibration device 400 may calibrate the corresponding characteristic value of the frequency synthesizer circuit 311. To be more specific, the probe circuit 430 may probe an input voltage of a VCO comprised in the frequency synthesizer circuit 311 and convert the probed input voltage into a digital value and provide it to the control circuit 420. The control circuit 420 may derive the frequency of the oscillating signal generated by the frequency synthesizer circuit 311 according to the probed input voltage and adjust the start-up voltage of the VCO based on the derived frequency and the target frequency. For example, if the currently synthesized frequency has not reached the target frequency, the control circuit 420 may increase the start-up voltage of the VCO, so that the frequency of the oscillating signal generated by the frequency synthesis circuit 311 may reach the target frequency faster.

Operation S609: The calibration device 400 may calibrate the corresponding characteristic value of the swing control circuit 307. To be more specific, the probe circuit 430 may probe the voltage of the transmission signal output by the swing control circuit 307 and the probed voltage of the transmission signal may be converted into a digital value and provided to the control circuit 420. The control circuit 420 may adjust the voltage level of the transmission signal output by the swing control circuit 307 according to the difference between the probed voltage and the target voltage of the transmission signal.

Operation S610: The calibration device 400 may calibrate the corresponding characteristic value of the equalizer circuit 302. To be more specific, the probe circuit 430 may probe the voltage of the reception signal output by the equalizer circuit 302 and the ADC circuit may convert the probed voltage into a digital value and provide it as the corresponding probe result to the control circuit 420. The control circuit 420 may establish a digital eye diagram based on the probed results and calibrate one or more parameters used by the CTLE or the CDR circuit according to the eye diagram. As an example, the control circuit 420 may adaptively adjust the gain of the CTLE.

According to an embodiment of the invention, in the calibration procedure, the transmission signal output by the swing control circuit 307 may be provided to the receiving circuit 301 as the reception signal for calibration through the internal feedback path 313 of the signal processing circuit 300 as shown in FIG. 3, and the equalizer circuit 302 may perform equalization on the reception signal for calibration. The probe circuit 430 may probe the voltage of the reception signal output by the equalizer circuit 302 and the control circuit 420 may calculate the change in the voltage based on the difference between the transmission signal and the reception signal, and further calculate the corresponding characteristic values of the equalizer circuit 302 and the swing control circuit 307 according to information regarding the change in the voltage, the target voltage of the transmission signal and the content of the eye diagram. As an example, if the control circuit 420 is unable to establish a clear eye diagram, it means that the voltage level of the transmission signal may be insufficient, so that the signal is not strong enough to resist the interference or attenuation of the transmission channel. In this case, the control circuit 420 may increase the voltage level of the transmission signal.

In the embodiments of the invention, the control circuit 420 may first perform the calibration on the signal processing devices that are insensitive to the adjustment of the other parameters, and then perform the calibration on the remaining signal processing devices. As an example, the control circuit 420 may be configured to calibrate the regulator circuit (e.g. the LDO regulator circuit 309) and the bandgap filter circuit (e.g. the bandgap filter circuit 310) first to obtain an adequate output voltage, and then calibrate the frequency synthesizer circuit (e.g. the frequency synthesizer circuit 311) which has to obtain the power signal from the regulator circuit and the bandgap filter circuit.

In the embodiments of the invention, with the proposed calibration device and calibration method, the characteristic values of the internal signal processing devices inside the SerDes are efficiently calibrated, so as to avoid the frequency or voltage jitter to occur in each component due to the deviation or drift of its characteristic value, which may eventually lead to the problem of causing a fatal error in the system.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An interface circuit, comprising:
 a signal processing circuit, configured to process a reception signal received from a host device and a transmission signal to be transmitted to the host device, wherein the signal processing circuit comprises:
 a plurality of signal processing devices; and
 a calibration device, coupled to the signal processing devices and configured to sequentially calibrate a characteristic value of each signal processing device in a calibration procedure, wherein the calibration device comprises:
  an error event detection circuit, configured to detect whether at least one of a plurality of predetermined error events has occurred and generate a trigger signal when detecting that at least one of the plurality of predetermined error events has occurred;
  a probe circuit, configured to probe each signal processing device to generate a corresponding probe result in response to the trigger signal; and
  a control circuit, coupled to the error event detection circuit and the probe circuit and configured to perform the calibration procedure in response to the trigger signal and adjust the characteristic value of each signal processing device according to the corresponding probe result in the calibration procedure.

2. The interface circuit as claimed in claim 1, wherein the interface circuit is disposed in a memory controller and the calibration procedure is triggered in response to at least one error event of the memory controller.

3. The interface circuit as claimed in claim 1, wherein the signal processing circuit is a Serializer-Deserializer.

4. The interface circuit as claimed in claim 1, wherein the plurality of signal processing devices comprise a regulator circuit and a frequency synthesizer circuit, and in the calibration procedure, the control circuit is configured to calibrate the regulator circuit first and then calibrate the frequency synthesizer circuit.

5. A memory controller, coupled to a memory device and configured to control access operation of the memory device, comprising:
 a host interface, configured to communicate with a host device and comprising a signal processing circuit configured to process a reception signal received from the host device and a transmission signal to be transmitted to the host device,
 wherein the signal processing circuit comprises:
 a plurality of signal processing devices; and
 a calibration device, coupled to the signal processing devices and configured to sequentially calibrate a characteristic value of each signal processing device in a calibration procedure, wherein the calibration device comprises:
  an error event detection circuit, configured to detect whether at least one of a plurality of predetermined error events has occurred and generate a trigger signal when detecting that at least one of the plurality of predetermined error events has occurred;
  a probe circuit, configured to probe each signal processing device to generate a corresponding probe result in response to the trigger signal; and
  a control circuit, coupled to the error event detection circuit and the probe circuit and configured to perform the calibration procedure in response to the trigger signal and adjust the characteristic value of each signal processing device according to the corresponding probe result in the calibration procedure;
 wherein in response to the trigger signal, the calibration device is configured to obtain the corresponding probe result of each signal processing device and calibrate the characteristic value of each signal processing device according to the corresponding probe result.

6. The memory controller as claimed in claim 5, wherein the calibration procedure is triggered in response to at least one error event of the memory controller.

7. The memory controller as claimed in claim 5, wherein the signal processing circuit is a Serializer-Deserializer.

8. The memory controller as claimed in claim 5, wherein the plurality of signal processing devices comprise:
 a first signal processing device; and
 a second signal processing device, wherein the second signal processing device obtains a power signal from the first signal processing device, and
 in the calibration procedure, the control circuit is configured to calibrate the first signal processing device and then calibrate the second signal processing device.

9. A method for calibrating a plurality of signal processing devices in an interface circuit, comprising:
 utilizing an error event detection circuit in a calibration device within the interface circuit to detect whether at least one of a plurality of predetermined error events has occurred and t generate a trigger signal when detecting that at least one of the plurality of predetermined error events has occurred;
 utilizing a probe circuit in the calibration device to probe each signal processing device in response to the trigger signal to generate a corresponding probe result; and
 sequentially calibrating a characteristic value of each signal processing device according to the corresponding probe result in response to the trigger signal in a calibration procedure, wherein sequentially calibrating the characteristic value of each signal processing device according to the corresponding probe result in response to the trigger signal in the calibration procedure further comprises:

utilizing a control circuit in the calibration device to perform the calibration procedure in response to the trigger signal and adjust the characteristic value of each signal processing device according to the corresponding probe result in the calibration procedure.

10. The method as claimed in claim 9, wherein the interface circuit is disposed in a memory controller and the plurality of predetermined error events are error events occurred in the memory controller.

* * * * *